United States Patent Office 3,459,307
Patented Aug. 5, 1969

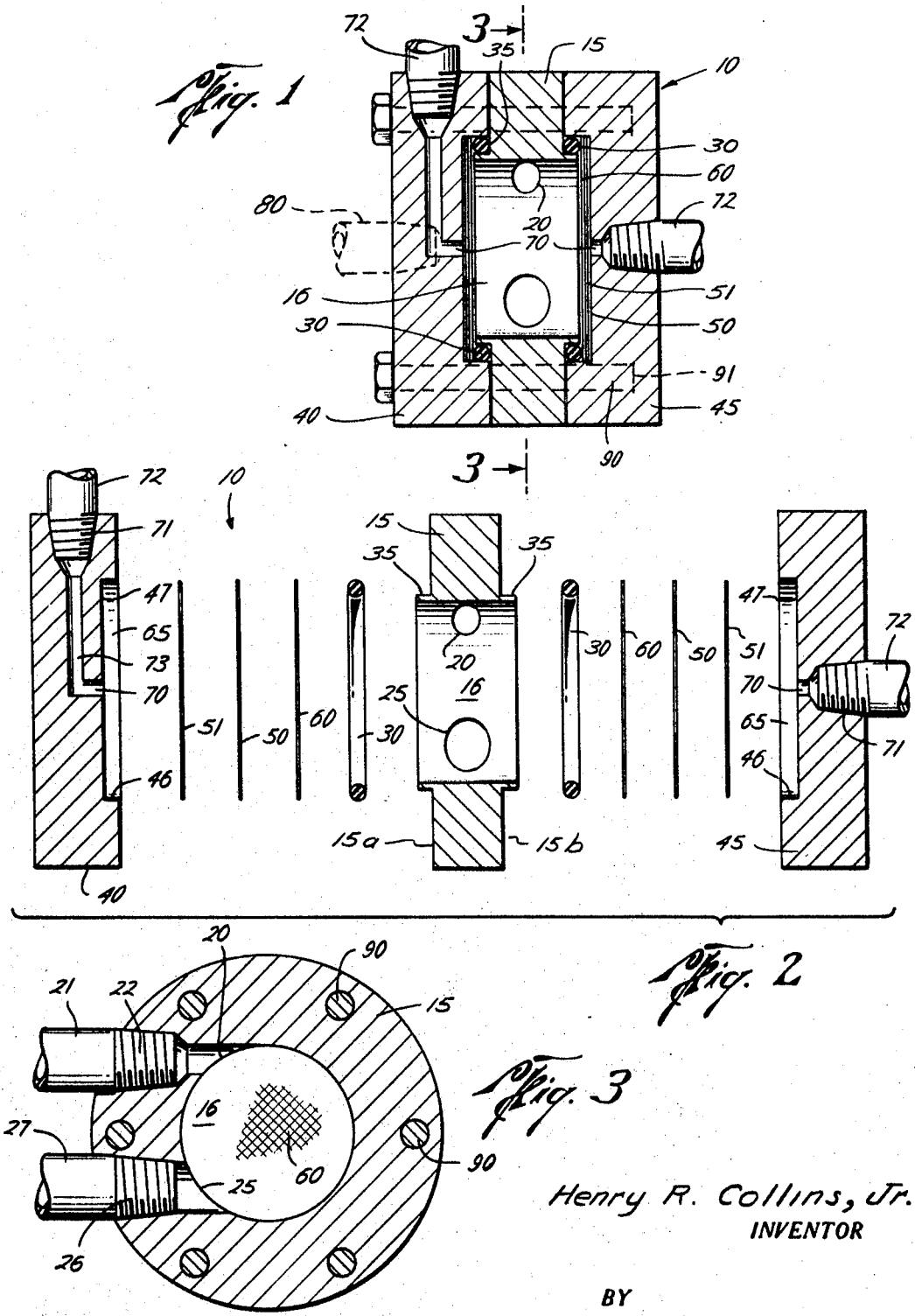

3,459,307
SMALL PARTICLE BYPASS FILTER MEANS
Henry R. Collins, Jr., 4507 Hemlock,
Baytown, Tex. 77520
Filed Oct. 11, 1967, Ser. No. 674,625
Int. Cl. B01d 27/10
U.S. Cl. 210—316        3 Claims

ABSTRACT OF THE DISCLOSURE

A filter means for removing undesired particles from process streams and the like utilizing a tangentially positioned opening into the cavity of a filter body to set up a swirling action of the process stream. Undesired particles are filtered and retained by a suitable filter while the stream enters into one of two entrance openings for communication with an analyzer and particles of larger size than the undesired particles are washed off the filters by the swirling action of the process stream in the filter cavity.

BACKGROUND OF THE INVENTION

Field of the invention

This invention relates to bypass filter means and more particularly to a small particle bypass filter means.

Description of the prior art

Prior bypass filters means also remove undesired particles from process streams but allow smaller undesired particles to accumulate in the analyzer sample valves or other unwanted places to clog, restrict, and plug such valves or other similar devices.

Prior bypass filters have generally been of the low washing action type in that filters positioned therein were not subjected to turbulent washing action and as a result may prior filters in the filter means had to continually replace their filters because of clogging of the filter by larger particles and the like.

SUMMARY OF THE INVENTION

Briefly, the present invention relates to a small particle bypass filter comprising a filter body having a tangential inlet and an outlet for process streams; a filter positioned on each side of the filter body and a filter cap mounted on each side of the body and having openings therein for enabling a portion of the process stream to communicate with desired analyzers.

An object of the present invention is to provide a new and improved small particle bypass filter means.

Yet still another object of the present invention is to provide a new and improved filter means including a filter body having a tangential entrance opening for process streams to continually wash the filters in the filter means.

Yet another object of the present invention is to provide a new and improved filter means for filtering particles of a desired size and smaller from a process stream while at the same time preventing larger particles from clogging the filter.

BRIEF DESCRIPTION OF THE DRAWING

FIG. 1 is a sectional view of the small particle bypass filter means of the present invention with the elements of such invention positioned together in their respective relationships;

FIG. 2 is a view, partly in section, of the small particle bypass filter means of the present invention wherein the elements of small particle bypass filter means are spread to clearly illustrate all the different elements thereof; and FIG. 3 is a sectional view taken along line 3—3 of FIG. 1 illustrating the inlet and outlet ports relative to the cavity in the filter body of the small particle bypass filter means of the present invention.

DESCRIPTION OF THE PREFERRED EMBODIMENT

Attention is directed to FIGS. 1 and 2 where the small particle bypass filter means of the present invention is generally designated by the numeral 10 and is illustrated as including a filter body 15. Filter body 15 may be constructed of any plastic or suitable metal such as steel, iron, or other alloy and includes a cavity 16 substantially in the center thereof. As illustrated in FIGS. 1, 2, and 3, an inlet port 20 enables the cavity 16 to communicate with an outside tubular member 21 by providing a channel 22 which extends between the member 21 and inlet port 20. The inlet port 20 is milled or formed in the filter body 15 such that it enables incoming fluids from process stream and the like to enter into the cavity 16 tangentially with respect thereto to set up a circular, swirling, washing action of the process stream in the cavity 16.

An outlet port 25 and outlet channel 26 in the body 15 enable the process stream to be moved from the small particle bypass filter means of the present invention through a tubular member 27 while also enabling communication of the stream with an analyzer and for filtering small particles from the process stream as will be described hereinbelow.

A pair of O-ring seals 30 or other suitable sealing means is mounted on each side 15a and 15b of the filter body 15 and cavity 16 on suitable O-ring seal lips 35 as illustrated in FIGS. 1 and 2. A first filter cap designated at 40 and a second filter cap designated at 45 include recessed sealing lips or edges 46 for enabling one of each of the O-ring seals to sealingly abut the milled flat surface 47 of each of the filter caps 40 and 45, respectively, as illustrated in FIG. 1. Thus, it should be apparent that the O-ring seals 30 prevent loss of fluid between the filter body 15 and each of the filter caps 40 and 45 by sealingly engaging the lips 35 of the filter body 15 and the recessed lips and milled flat portions 46 and 47 of each of the first and second filter caps 40 and 45.

A pair of screens 50 and 51 is received within and abut the lips 46 and milled flat portion 47 in each of the filter caps 40 and 45, respectively, and are positioned between the O-ring seals 30 and the flats 47 as illustrated in FIGS. 1 and 2. A filter 60 which may, for example only, be a Gelman 47 millimeter diameter acropor-800, is positioned between each of the O-ring seals 30 and each of the mesh screens 50 and 51. Each filter 60 is of suitable and sufficient diameter to be positioned in the recess formed by the lips 46 and milled flats 47 of each of the filter caps 40 and 45 as illustrated in FIG. 1 and is spaced from each of the flats 47 by the screens 50 and 51 to enable fluid to penetrate all of the filter 60 rather than a small portion thereof.

Each of the filter caps 40 and 45 includes or is provided with analyzer openings 70 which communicate with the recesses 65 formed by the milled flat 47 and lips 46. Analyzer opening 70 in filter cap 45 communicates with threaded channel 71 in the cap 45 which in turn communicates with a threadedly engaged tubular member 72. Analyzer opening 70 in filter cap 40 communicates with a transverse analyzer channel 73 which in turn communicates with threaded channel 71 and threadedly engaged tubular member 72. Each tubular member 72 extends outwardly and is joined together at some portion to be fed into a suitable analyzer system for analyzing the fluid process stream as is well known in the art. It should be noted that the analyzer channel 73 in filter cap 40 is positioned transversely to enable the filter cap 40 to be positioned with suitable brackets and the like for positioning of the small particle bypass filter means of the present invention to a wall. It should also be noted, and as illustrated in FIG. 1 by the dotted line, that the filter channel 70 may extend outwardly parallel to the filter channel 70 in filter cap 45 as desired and into a threaded tubular member 80.

A suitable bolt means 90 extends through openings 91 in each of the filter caps 40 and 45 and the filter body 15 such that when the bolt openings 91 are aligned, bolts 90 may be inserted therein for threadedly engaging and retaining the small particle bypass filter means of the present invention together.

In the operation of the invention, fluid from a process stream is routed through tubular member 21 and into the cavity 16 through the tangential inlet opening 20 such that the fluid is circularly swirling in the cavity 16 to exit through the outlet 25 and into the tubular member 27 to return to the process stream.

Fluid in the cavity penetrates through the filters 60 and screens 50 and 51 on each side of the filter body 16 to be removed through the analyzer channel 70 and tubular member 72 to a suitable analyzing system. Small undesired particles are filtered and retained by the filter 60 to prevent clogging and restriction of the analyzer equipment. Larger particles will be swept with the process stream out the opening 25 or, if they should become lodged on the filters 60, will be swept or brushed off the filters 60 by the circular swirling action of the fluid stream.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:
1. A small particle bypass filter means for process streams and the like comprising:
  (a) a filter body having a cavity therein;
  (b) said filter body having an inlet port communicating with said cavity, said inlet port being positioned tangentially relative to its entrance into said cavity wherein process streams entering into said cavity are swirled around by following the periphery of said cavity;
  (c) said filter body having an outlet port communicating with said cavity for removal of the process stream from said cavity;
  (d) a first filter positioned adjacent one side of said cavity and transverse to said inlet and outlet ports;
  (e) a second filter positioned adjacent the other side of said cavity and transverse to said inlet and outlet ports;
  (f) a first filter cap having an analzer opening therein, said cap being positioned with said body on the same side as said first filter wherein said first filter is positioned between said cavity and said analyzer opening;
  (g) a second filter cap having an analyzer opening therein, said cap being positioned with said body on the same side as said second filter wherein said second filter is positioned between said cavity and said analyzer opening in said second cap and wherein said analyzer openings communicate with means for analyzing the process stream.
2. The structure as set forth in claim 1 including:
  (a) sealing means mounted between each of said first and second caps and said filter body; and
  (b) screen mesh mounted between each of said first and second filters and said anlyzer openings of each of said first and second caps.
3. The structure as set forth in claim 2 wherein particles of two microns and less are retained by said first and second filter and wherein larger particles remain and are retained in the process streams due to the swirling action of the process stream in said cavity.

References Cited
UNITED STATES PATENTS

| | | | |
|---|---|---|---|
| 1,023,844 | 4/1912 | Hansen | 210—316 |
| 1,062,942 | 5/1913 | Woods | 210—433 X |
| 1,202,356 | 10/1916 | Blackmer | 210—409 X |
| 2,332,188 | 10/1943 | Andrews | 210—409 |
| 3,241,676 | 3/1966 | Neuville et al. | 210—433 X |
| 3,369,669 | 2/1968 | Loftin | 210—433 X |

REUBEN FRIEDMAN, Primary Examiner

JOHN ADEE, Assistant Examiner

U.S. Cl. X.R.

210—332, 409, 433